UNITED STATES PATENT OFFICE.

HUGH BURGESS, OF ARDMORE, AND SAMUEL H. EGOLF, OF SPRING CITY, PENNSYLVANIA.

MANUFACTURE OF GLASS, CEMENT, CERAMIC WARE, &c.

SPECIFICATION forming part of Letters Patent No. 339,525, dated April 6, 1886.

Application filed January 6, 1886. Serial No. 187,826. (No specimens.)

*To all whom it may concern:*

Be it known that we, HUGH BURGESS, a subject of the Queen of Great Britain and Ireland, residing in Ardmore, Pennsylvania, and SAMUEL H. EGOLF, a citizen of the United States, residing in Spring City, Pennsylvania, have invented certain Improvements in the Manufacture of Glass, Cement, Ceramic Ware, &c., of which the following is a specification.

Our invention consists of a method of utilizing in the manufacture of glass, cement, ceramic ware, &c., the carbonated alkaline earths—such as lime, strontium, baryta, &c.—which result from the decarbonization of soluble carbonated alkalies by boiling them with the alkaline earths in a caustic condition. These carbonated alkaline earths form a refuse or waste, which has so far been unavailable for any commercial or agricultural use, and has been a source of considerable annoyance to the manufacturer. We propose to so treat this refuse or waste that it can be utilized for commercial or agricultural purposes—as, for instance, for the manufacture of glass, cement, ceramic ware, &c., or as a manure, or as a gas-purifier, or for the reuse of the waste as a decarbonating agent.

The carbonated alkaline earths—baryta, lime, strontium, &c.—which have been used to remove the carbonic acid from the soluble carbonated alkalies by boiling one with the other are separated from the soluble caustic alkalies by precipitation and settlement and filtration. The result is a pasty wet mass after the removal of the caustic alkaline solutions from it. We take this pasty wet mass and add to it a certain proportion of freshly-burned caustic alkaline earth by any suitable means or in any suitable apparatus. The water in the pasty mass is absorbed by the freshly-burned caustic alkaline earth, which is thereby slacked, and the whole mass becomes dry and friable if the proper relative proportions of the wet carbonated alkaline earth and dry caustic alkaline earth are used.

The proportions we prefer are about one part of the dry caustic alkaline earth to six parts of the wet pasty mass.

By the above method the wet sludge or waste, which is unfit for transportation or for any other purpose, is rendered fit for commercial purposes, and is in a proper condition to be further prepared, if necessary, for other objects, such as for the manufacture of glass, cement, ceramic ware, &c.; or, when burned, it can be reused as a decarbonizing agent. It may also be used for fertilizing purposes in agriculture, or may be employed in the purifiers of gas apparatus.

We claim as our invention—

The mode herein described of utilizing the waste alkaline earths resulting from the treatment of soluble carbonated alkalies, said mode consisting in adding to the waste mass freshly-burned caustic alkaline earth in about the proportion set forth, and thereby rendering the whole mass dry and friable, substantially as set forth.

In testimony whereof we have signed our names to this specification in the presence of two subscribing witnesses.

HUGH BURGESS.
     SAMUEL H. EGOLF.

Witnesses:
 WILLIAM D. CONNER,
 HARRY SMITH.